(12) United States Patent
Suwa et al.

(10) Patent No.: US 7,741,229 B2
(45) Date of Patent: Jun. 22, 2010

(54) METHOD FOR MANUFACTURING MAGNETIC RECORDING MEDIUM

(75) Inventors: Takahiro Suwa, Tokyo (JP); Shuichi Okawa, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1226 days.

(21) Appl. No.: 11/297,353

(22) Filed: Dec. 9, 2005

(65) Prior Publication Data

US 2006/0124585 A1 Jun. 15, 2006

(30) Foreign Application Priority Data

Dec. 13, 2004 (JP) ............................. 2004-360151
Aug. 25, 2005 (JP) ............................. 2005-244846

(51) Int. Cl.
*H01L 21/302* (2006.01)

(52) U.S. Cl. .................. 438/737; 438/714; 438/723; 216/67; 216/72

(58) Field of Classification Search .......... 438/700, 438/702, 706, 714, 719, 723, 724, 725, 692, 438/737; 216/22, 58, 67
See application file for complete search history.

(56) References Cited

U.S. PATENT DOCUMENTS

| | | | |
|---|---|---|---|
| 4,935,278 A | 6/1990 | Krounbi et al. | |
| 6,074,959 A * | 6/2000 | Wang et al. | 438/738 |
| 6,583,957 B1 | 6/2003 | Takeshita et al. | |
| 6,586,044 B1 | 7/2003 | Takeshita et al. | |
| 6,635,185 B2 * | 10/2003 | Demmin et al. | 216/64 |
| 6,670,278 B2 * | 12/2003 | Li et al. | 438/710 |
| 2005/0048198 A1 * | 3/2005 | Suwa et al. | 427/127 |
| 2005/0086795 A1 * | 4/2005 | Suwa et al. | 29/603.01 |
| 2005/0175791 A1 * | 8/2005 | Hattori et al. | 427/548 |
| 2005/0186356 A1 * | 8/2005 | Hattori et al. | 427/548 |
| 2005/0199581 A1 * | 9/2005 | Suwa et al. | 216/22 |
| 2005/0287397 A1 * | 12/2005 | Soeno et al. | 428/831 |
| 2006/0021966 A1 * | 2/2006 | Hattori et al. | 216/41 |

FOREIGN PATENT DOCUMENTS

| | | |
|---|---|---|
| JP | A 1-279421 | 11/1989 |
| JP | A 5-22291 | 3/1993 |
| JP | A 2000-195042 | 7/2000 |
| JP | A 2001-110050 | 4/2001 |
| WO | WO 01/26101 A1 | 4/2001 |

* cited by examiner

*Primary Examiner*—Lan Vinh
(74) *Attorney, Agent, or Firm*—Oliff & Berridge, PLC

(57) ABSTRACT

A method for manufacturing a magnetic recording medium is provided, which can manufacture a magnetic recording medium that includes a recording layer having a concavo-convex pattern and has a sufficiently flat surface. The method includes the steps of: forming an object to be processed including a recording layer having a predetermined concavo-convex pattern formed over a substrate and a first mask layer (temporary underlying material) formed at least on recording elements (convex portions) of the recording layer; depositing a filling material on the object to be processed to fill concave portions; removing a part of the filling material by dry etching to expose at least side faces of the first mask layer; and removing the first mask layer by an etching method in which an etching rate of the first mask layer is higher than that of the filling material to flatten a surface.

17 Claims, 7 Drawing Sheets

METHOD FOR MANUFACTURING MAGNETIC RECORDING MEDIUM

BACKGROUND OF THE INVENTION

1. Field of the Invention

The present invention relates to a manufacturing method of a magnetic recording medium including a recording layer having a concavo-convex pattern.

2. Description of the Related Art

Conventionally, in a magnetic recording medium such as a hard disk, various types of development such as miniaturization of magnetic particles forming a recording layer, change of a material, and finer head processing have been made to largely improve areal density of the recording layer. The improvement of the areal density is expected to continue. However, many problems including the limitation of the magnetic head processing, improper recording of information onto a track adjacent to a target track and crosstalk that are caused by broadening of a magnetic field, and the like have been made apparent. Thus, the improvement of the areal density by the conventional development approach has reached the limit.

Therefore, a magnetic recording medium such as a discrete track medium and a patterned medium, that includes a recording layer formed in a predetermined concavo-convex pattern in which recording elements form convex portions, has been proposed as a candidate of a magnetic recording medium that enables further improvement of the areal density.

On the other hand, a magnetic recording medium such as a hard disk has a problem that a flying height of a head slider is unstable in a case where concavity and convexity of a surface is large. Thus, a magnetic recording medium has been proposed in which concave portions between recording elements are filled with a filling material so as to flatten a surface of a recording layer (see Japanese Patent Laid-Open Publication No. 2000-195042, for example).

A method using a lift-off technique is known as a method for filling the concave portions of the recording layer having a concavo-convex pattern with the filling material so as to flatten the surface of the recording layer. An exemplary method is now described. First, a continuous recording layer and a resist layer are uniformly formed over a substrate. The resist layer in regions corresponding to the concave portions of the concavo-convex pattern is then removed by exposure and development, so that the resist layer covers portions of the continuous recording layer that correspond to the convex portions only. An exposed portion of the continuous recording layer is etched in that state, thereby forming the recording layer with the concavo-convex pattern formed therein. Then, the filling material is deposited on the recording layer and the resist layer so as to fill the concave portions of the recording layer with the filling material. The filling material is formed to have a concavo-convex pattern following the concavo-convex pattern of the recording layer and is also deposited on the resist layer. Finally, the resist layer is dissolved using an organic solvent so as to be removed together with the filling material formed thereon. In this manner, the filling material is left in the concave portions only and the surface of the recording layer is flattened (see Japanese Patent Publication No. Hei 5-22291 and Japanese Patent Laid-Open Publication No. 2001-110050, for example).

However, the filling material is also deposited on side faces of the resist layer. The thus deposited part of the filling material may remain while being integrated with the filling material in the concave portion, after removal of the resist layer. In other words, the filling material is used for filling the concave portions of the concavo-convex pattern and may also form a projection near an end of the concave portion. In this case, the surface of the recording layer is not flattened sufficiently.

If the resist layer is formed to be excessively thick, formation of the projection can be suppressed because it is difficult for the filling material to be deposited around the base of the side face of the resist layer. However, the excessively thick resist layer may cause easy destruction of the convex portion of the resist layer that is processed to have a concavo-convex pattern by exposure and development or may lower processing accuracy of the recording layer.

SUMMARY OF THE INVENTION

In view of the foregoing problems, various exemplary embodiments of this invention provide a method for manufacturing a magnetic recording medium which includes a recording layer having a concavo-convex pattern and has a sufficiently flat surface.

According to various exemplary embodiments of this invention, after a filling material is deposited on an object to be processed in which a temporary underlying material is deposited on convex portions of a recording layer to fill concave portions, an excess part of the filling material is removed by dry etching that tends to selectively remove a convex portion faster than a concave portion. Thus, it is possible to efficiently remove the filling material covering side faces of the temporary underlying material. Moreover, when an etching method in which an etching rate of the temporary underlying material is higher than that of the filling material is used, the temporary underlying material can be selectively removed and a surface can be flattened.

The etching method for selectively removing the temporary underlying material is preferably dry etching using reactive gas having a property of chemically reacting with the temporary underlying material to remove the temporary underlying material. Production efficiency can be largely improved by performing both removal of the excess part of the filling material and flattening (removal of the temporary underlying material) by dry etching, as compared with a case of using a dry process and a wet process together.

Alternatively, the excess part of the filling material and the temporary underlying material may be removed in one step by using dry etching in which the etching rate of the temporary underlying material is higher than that of the filling material. Flattening the surface in one step in that manner can further improve the production efficiency.

During a process of making the present invention, the inventors considered that the surface could be flattened only by removing the excess part of the filling material that was deposited in a concavo-convex pattern following the concavo-convex pattern of the recording layer by dry etching that tended to selectively remove a convex portion faster than a concave portion, such as ion beam etching. The inventors actually tested this method.

However, it was difficult to sufficiently reduce a step in the surface to a desired level only by removing the excess part of the filling material by ion beam etching. The reason for this is generally considered as follows.

Dry etching tends to selectively remove convex portions of a surface faster than concave portions. However, if widths of the convex portions are different, an etching rate varies depending on the difference. That is, a narrow convex portion can be removed faster than a wide convex portion. Please note that the width of the convex portion means the smallest width of the convex portion near a top of the convex portion in a direction approximately perpendicular to a height direction of the convex portion.

A magnetic recording medium is divided into a data region and a servo region when it is used. In a magnetic recording medium including a recording layer having a concavo-convex pattern, such as a discrete track medium or a patterned medium, the concavo-convex pattern of the recording layer in the data region and that in the servo region are largely different from each other, even if the concavo-convex pattern is generally the same in the data region. The concavo-convex pattern of the recording layer in the servo region frequently becomes complicated so as to correspond to a servo information pattern. For this reason, surface roughness is different between the data region and the servo region or is varied in the servo region, or a step in the surface is generated.

On the other hand, suppose that an object to be processed in which the concave portions are filled with the filling material and the convex portions are formed by the temporary underlying material is prepared, and that the temporary underlying material is removed by dry etching in which the etching rate of the temporary underlying material is higher than that of the filling material forming the concave portions. In this case, it is possible to remove all the convex portions formed by the temporary underlying material in a short time irrespective of the widths of the convex portions, while the processing of the concave portions is suppressed. Therefore, it is possible to prevent generation of the difference of the surface roughness and formation of the step in the surface.

Accordingly, various exemplary embodiments of the invention provide a method for manufacturing a magnetic recording medium comprising:

an object to be processed forming step of forming an object to be processed that includes a recording layer formed in a predetermined concavo-convex pattern over a substrate and a temporary underlying material formed at least on convex portions of the recording layer;

a filling material depositing step of depositing a filling material different from the temporary underlying material on the object to be processed to fill concave portions of the concavo-convex pattern with the filling material;

a filling material removing step of removing at least a part of an excess part of the filling material by dry etching to expose at least side faces of the temporary underlying material formed on the convex portions of the recording layer, the excess part of the filling material being located on an opposite side of a top surface of the convex portions of the recording layer to the substrate; and a flattening step of flattening a surface by removing the temporary underlying material by an etching method in which an etching rate of the temporary underlying material is higher than that of the filling material.

Alternatively, various exemplary embodiments of the invention provide a method for manufacturing a magnetic recording medium comprising:

an object to be processed forming step of forming an object to be processed that includes a recording layer formed in a predetermined concavo-convex pattern over a substrate and a temporary underlying material formed at least on convex portions of the recording layer;

a filling material depositing step of depositing a filling material different from the temporary underlying material on the object to be processed to fill concave portions of the concavo-convex pattern with the filling material; and a flattening step of flattening a surface by removing an excess part of the filling material and the temporary underlying material by dry etching, the excess part of the filling material being located on an opposite side of a top surface of the convex portions of the recording layer to the substrate, an etching rate of the temporary underlying material being higher than that of the filling material in the dry etching.

In the present application, the "recording layer formed in a concavo-convex pattern" is used to include a recording layer obtained by dividing a continuous recording layer into a number of recording elements in a predetermined pattern, a recording layer obtained by partially dividing a continuous recording layer in a predetermined pattern in such a manner that the recording layer is formed by recording elements which are continuous partly, a recording layer continuously formed on a part of a substrate, such as a spirally formed recording layer, and a continuous recording layer including both a convex portion and a concave portion.

In the present application, the term "etching rate" is used to mean the processed amount per unit time.

The term "magnetic recording medium" used in this description should not be limited to hard disks, "floppy"™ disks, magnetic tapes and the like which use only magnetism for writing and reading data, but should include other recording media such as magneto optical (MO) recording media that use light with magnetism and heat assisted recording media that use heat with magnetism.

In this application, the term "ion beam etching" is used to collectively mean processing methods for removing process target by irradiating an object to be processed with ionized gas, such as ion milling.

According to various exemplary embodiments of this invention, a magnetic recording medium that includes a recording layer having a concavo-convex pattern and has a sufficiently flat surface can be manufactured.

DETAILED DESCRIPTION OF THE INVENTION

Figure 1:
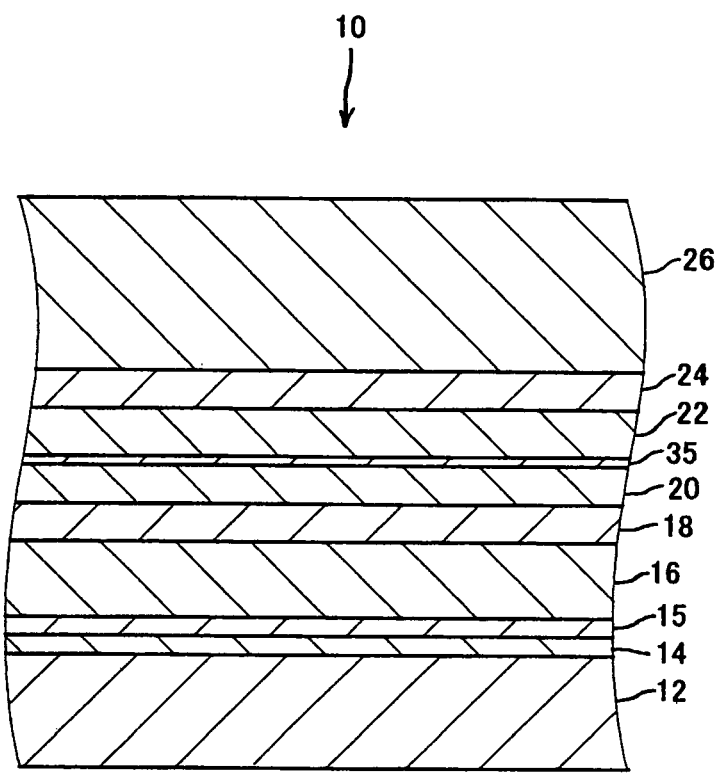
FIG. 1 is a schematic cross-sectional side view showing the starting body of an object to be processed according to a first exemplary embodiment of the present invention.

Preferred exemplary embodiments of the present invention are now described with reference to the drawings.

A first exemplary embodiment of the present invention relates to a method for manufacturing a magnetic recording medium 30. The method includes: processing a starting body of an object to be processed 10 shown in FIG. 1, in which a continuous recording layer 20 and other layers are formed over a substrate 12, so as to divide the continuous recording layer 20 into a number of recording elements 32A (convex portions of a recording layer), as shown in FIG. 2, and form the recording layer 32 having a predetermined concavo-convex pattern; and filling concave portions 34 between the recording elements 32A (concave portions of the concavo-convex pattern) with a filling material 36 to flatten a surface. The manufacturing method of the first exemplary embodiment has a feature in a filling material removing step of removing an excess part of the filling material 36 and a flattening step of flattening the surface. The other steps are not considered to be important for understanding of the first exemplary embodiment and therefore the description thereof is omitted.

Figure 2:
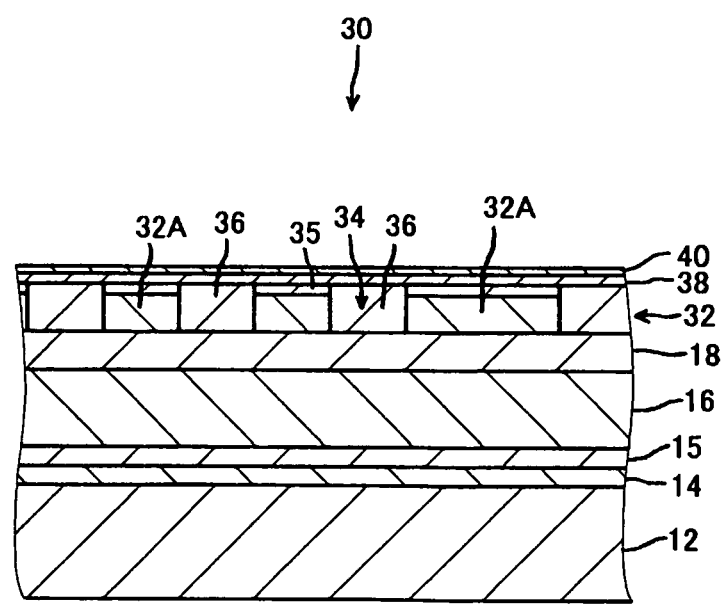
FIG. 2 is a schematic cross-sectional side view showing the structure of a magnetic recording medium obtained by processing the object to be processed.

The starting body of the object to be processed 10 includes an underlayer 14, an antiferromagnetic layer 15, a soft magnetic layer 16, a seed layer 18, a continuous recording layer 20, a stop film 35, a first mask layer (temporary underlying material) 22, a second mask layer 24, and a resist layer 26 that are formed over a substrate 12 in that order, as shown in FIG. 1.

The substrate 12 is made of glass, $Al_2O_3$ (alumina) or the like. The underlayer 14 has a thickness of 2 to 40 nm and is made of Ta, for example. The antiferromagnetic layer 15 has a thickness of 5 to 50 nm and is made of a PtMn alloy, a RuMn alloy, or the like. The soft magnetic layer 16 has a thickness of 50 to 300 nm and is made of a Fe (iron) alloy or a Co (cobalt) alloy. The seed layer 18 has a thickness of 2 to 40 nm and is made of a nonmagnetic CoCr alloy, Ti, Ru, a stack of Ru and Ta, MgO, or the like.

The continuous recording layer 20 has a thickness of 5 to 30 nm and is made of a CoCr (cobalt-chrome) alloy.

The first mask layer 22 has a thickness of 3 to 50 nm and is made of C (carbon). The first mask layer 22 also serves as a temporary underlying material that is selectively removed in a short time in the flattening step (S108) that will be described later.

The second mask layer 24 has a thickness of 3 to 30 nm and is made of Ni (nickel). The resist layer 26 has a thickness of 30 to 300 nm and is formed from a negative resist (NEB22A manufactured by Sumitomo Chemical Co., Ltd.).

The stop film 35 has a thickness of 1 to 10 nm and is made of Ta (tantalum). The etching rate of Ta in ion beam etching using Ar (argon) gas as process gas is higher than that of C (the first mask layer 22) when an incident angle of Ar gas is high (about 90°), but is lower than that of C (the first mask layer 22=the temporary underlying material) when the incident angle of Ar gas is low (about −10° to about 15°). Thus, a layer of Ta can serve as a stop film in the filling material removing step of removing the filling material (S106) that will be described later. Moreover, the etching rate of Ta in dry etching using $O_2$ (oxygen) or $O_3$ (ozone) gas as process gas is lower than that of C. Thus, the layer of Ta can also serve as a stop film in the flattening step (S108) that will be described later. That is, the stop film 35 can serve as both the stop film for the filling material removing step and the stop film for the flattening step.

In the present description, the term "incident angle" is used to mean an incident angle with respect to a surface of the object to be processed, which is formed by the surface of the object to be processed and a central axis of ion beams. For example, when the central axis of the ion beams is parallel to the surface of the object to be processed, the incident angle is 0°.

The magnetic recording medium 30 is a perpendicular recording type discrete track magnetic disk. The recording layer 32 in the magnetic recording medium 30 has a concavo-convex pattern obtained by radially dividing the continuous recording layer 20 into a number of recording elements 32A that have shapes of concentric arcs at fine intervals. The stop film 35 is formed on the recording elements 32A. A protective layer 38 and a lubricating layer 40 are formed on the stop film 35 and the filling material 36 in that order. The recording layer 32 is formed in a predetermined servo pattern in a servo region of the magnetic recording medium 30.

The filling material 36 is $SiO_2$ (silicon dioxide) that is nonmagnetic.

The protective layer 38 is formed from a film of hard carbon called as diamond-like carbon. Please note that the term "diamond-like carbon (hereinafter, referred to as "DLC") in this description refers to a material that is mainly composed of carbon and has an amorphous structure and a hardness of about $2 \times 10^9$ to $8 \times 10^{10}$ Pa measured by Vickers hardness testing. The lubricating layer 40 is made of PFPE (perfluoropolyether).

Figure 3:
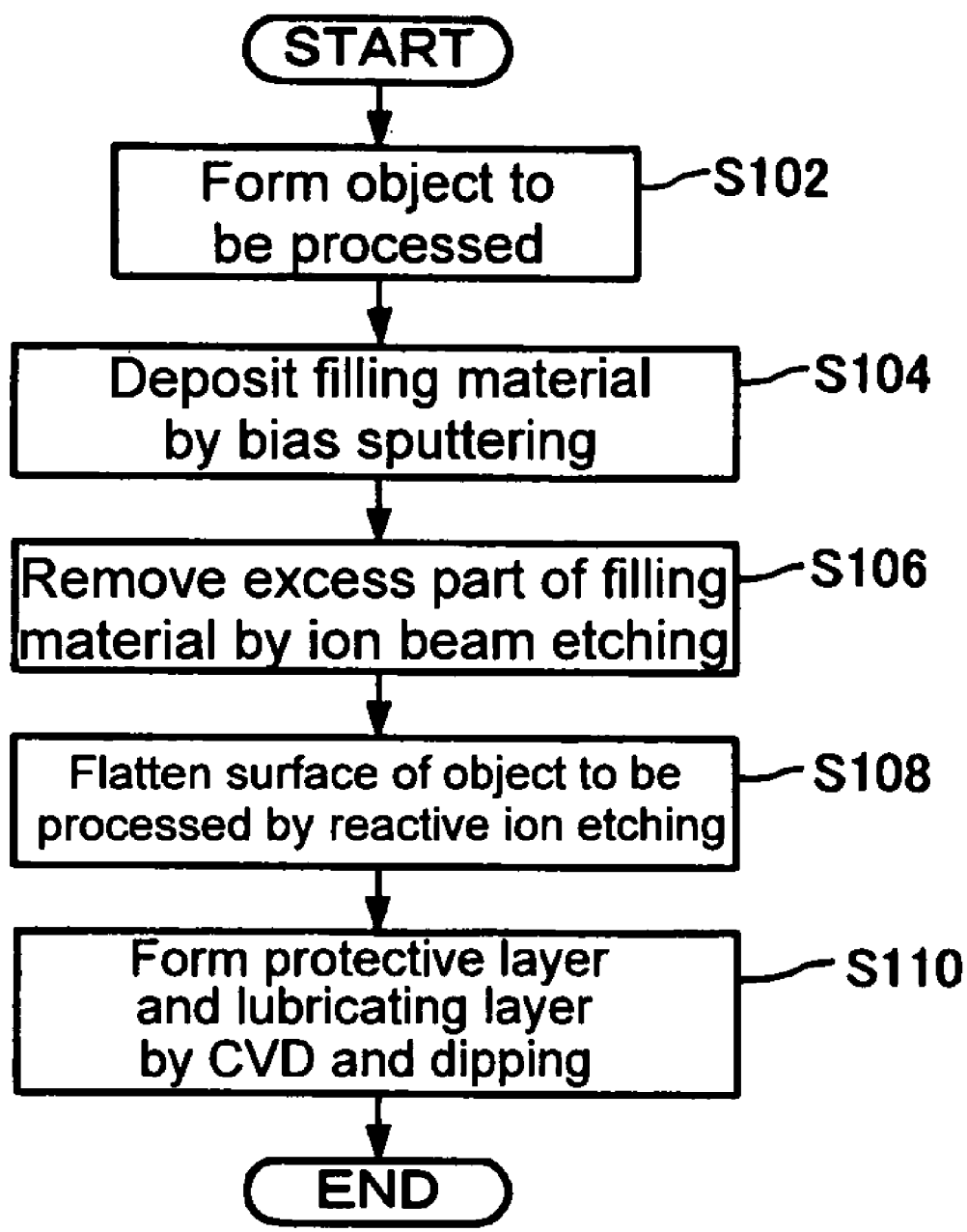
FIG. 3 is a flowchart generally showing a manufacturing process of the magnetic recording medium.

A method for processing the object to be processed 10 is now described based on a flowchart of FIG. 3.

First, an object to be processed forming step of forming the object to be processed is performed (S102). More specifically, the starting body of the object to be processed 10 shown in FIG. 1 is processed, thereby forming the object to be processed 10 that includes the recording layer 32 formed in a concavo-convex pattern and the first mask layer 22 (the temporary underlying material) formed on the convex portions of the recording layer 32 serving as the recording elements 32A. The starting body is obtained by forming the underlayer 14, the antiferromagnetic layer 15, the soft magnetic layer 16, the seed layer 18, the continuous recording layer 20, the stop film 35, the first mask layer 22, and the second mask layer 24 over the substrate 12 in that order by sputtering, and then applying the resist layer 26 by spin coating. The resist layer 26 may be applied by dipping.

Figure 4:
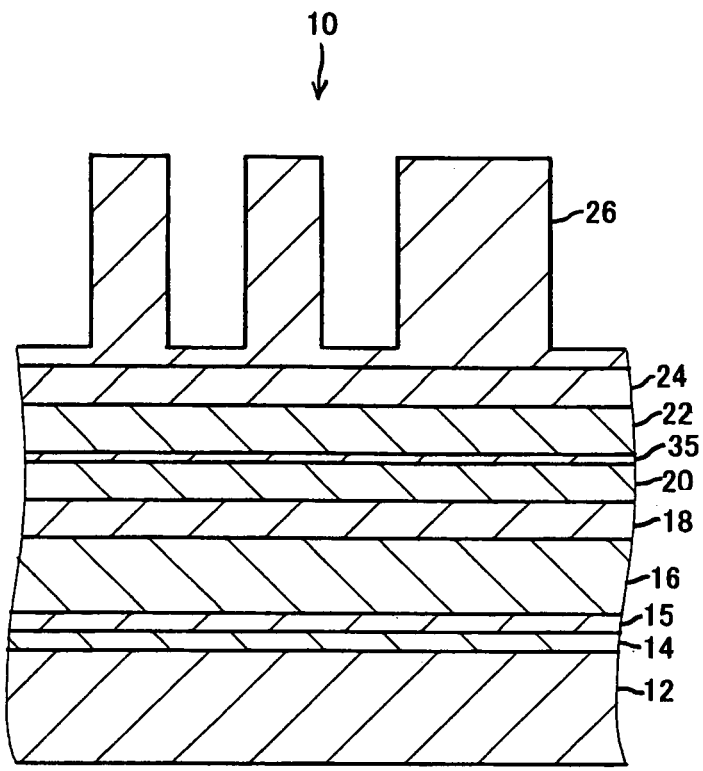
FIG. 4 is a schematic cross-sectional side view showing a concavo-convex pattern transferred onto a resist layer in the starting body of the object to be processed.

A concavo-convex pattern corresponding to a predetermined servo pattern and a track pattern, which includes contact holes, as shown in FIG. 4, is transferred onto the resist layer 26 in the starting body of the object to be processed 10 by nanoimprinting using a transfer device (not shown). Then, the resist layer 26 under the bottom of the concave portions is removed by reactive ion etching using $O_2$ or $O_3$ gas as reactive gas. Alternatively, the concavo-convex pattern may be formed by performing exposure and development of the resist layer 26.

Figure 5:
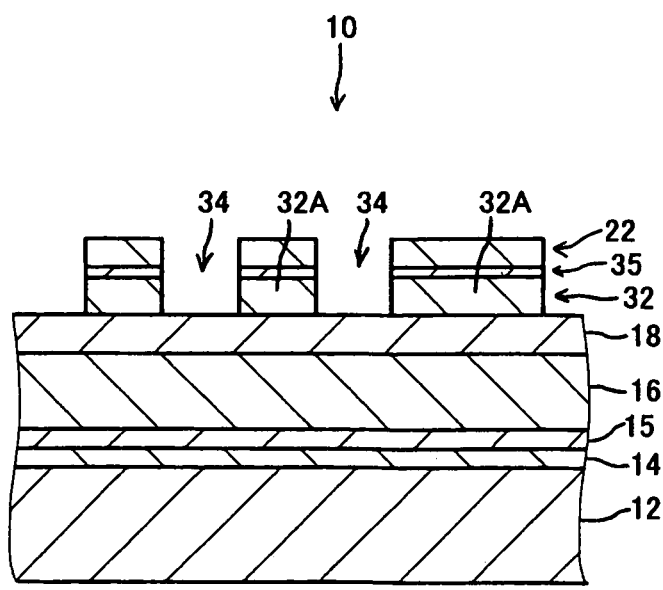
FIG. 5 is a schematic cross-sectional side view showing a shape of the object to be processed in which a continuous recording layer is divided.

The second mask layer 24 under the bottom of the concave portions is removed by ion beam etching using Ar gas (incident angle is about 90°). The first mask layer 22 under the bottom of the concave portions is then removed by reactive ion etching using $O_2$ or $O_3$ gas. The stop film 35 and the continuous recording layer 20 that exist under the bottom of the concave portions are then removed by ion beam etching using Ar gas so as to divide the continuous recording layer 20 into a number of recording elements 32A. In that ion beam etching, the first mask layer 22 is left on the recording elements 32A as the temporary underlying material. In this manner, the object to be processed 10 that includes the recording layer 32 formed in the concavo-convex pattern and the first mask layer 22 (the temporary underlying material) formed on the recording elements 32A that are convex portions of the recording layer 32 is obtained, as shown in FIG. 5.

Then, a filling material depositing step of the filling material is performed (S104). More specifically, the filling material 36 is deposited on a surface of the object to be processed 10 by bias sputtering. $SiO_2$ particles try to be uniformly deposited on the surface of the object to be processed 10. Therefore, a surface of deposited $SiO_2$ tends to become concavo-convex. However, when a bias voltage is applied to the object to be processed 10, sputtering gas is biased toward the object to be processed 10 so as to collide with deposited $SiO_2$ and etch a part of deposited $SiO_2$. This etching action tends to selectively remove projecting portions of deposited $SiO_2$ faster than other portions. Thus, concavo-convex shape of the surface is made even to some degree. When a depositing action occurs more than the etching action, deposition makes progress while the level of the concavo-convex shape of the surface is suppressed.

Figure 6:
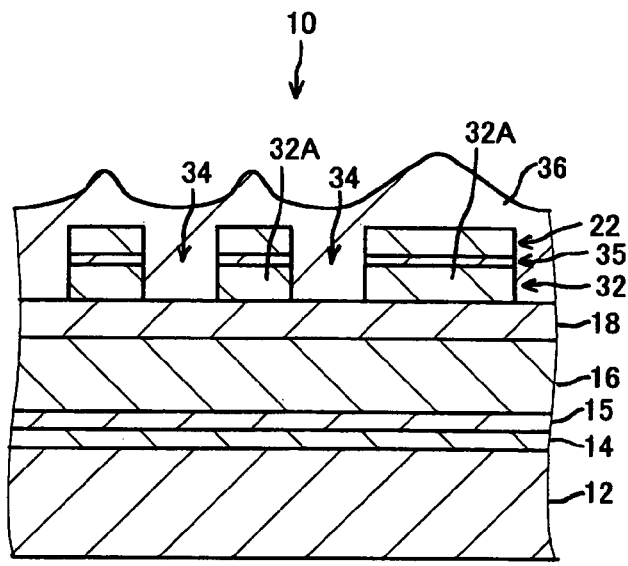
FIG. 6 is a schematic cross-sectional side view showing the shape of the object to be processed in which a filling material is deposited.

As a result, the filling material 36 is deposited in a shape in which concavity and convexity of its surface are suppressed to some degree so as to cover the recording layer 32, and the concave portions 34 are filled with the filling material 36, as shown in FIG. 6. Please note that the concavo-convex shape of the filling material 36 is exaggerated in FIG. 6 in order to help understanding of the first exemplary embodiment.

Figure 7:
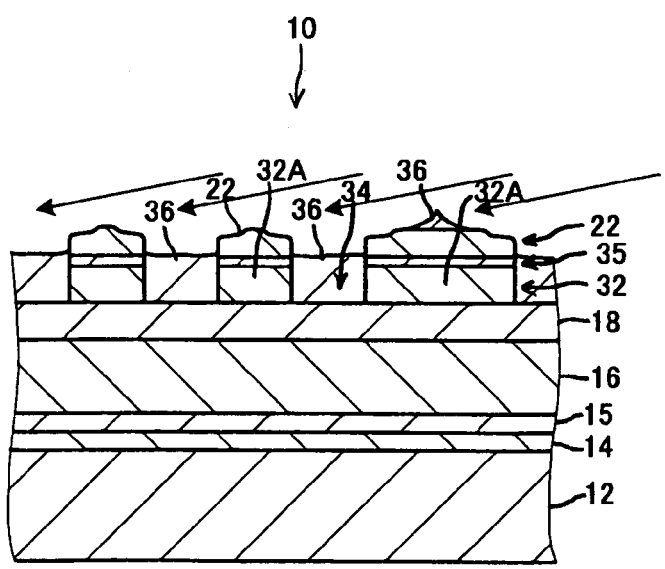
FIG. 7 is schematic cross-sectional side view showing the shape of the object to be processed in which an excess part of the filling material is removed to expose a first mask layer.

Next, the filling material removing step is performed (S106). More specifically, ion beam etching using Ar gas is performed in such a manner that an incident angle of Ar gas is set to 2°. In this manner, an excess part of the filling material 36, that is a part located on an opposite side of a top surface of the recording elements 32A to the substrate 12, is removed so as to expose at least side faces of the first mask layer (temporary underlying material) 22, as shown in FIG. 7.

Dry etching tends to selectively remove a convex portion faster than a concave portion. Therefore, dry etching can efficiently remove the filling material 36 covering the side faces of the first mask layer (the temporary underlying material) 22. Especially, ion beam etching (including reactive ion beam etching) is more likely to selectively remove a convex portion faster than a concave portion and therefore has a higher flattening effect. Moreover, when noble gas such as Ar gas is used as process gas in ion beam etching, an effect of anisotropic etching is high. Thus, the tendency of selectively removing the convex portion faster than the concave portion becomes stronger and therefore the flattening effect is further enhanced.

The incident angle of Ar gas is not limited to 2°. However, it is preferable to make Ar gas incident on the object to be processed 10 from a direction that is inclined with respect to a normal of the surface of the object to be processed 10, as shown with arrows in FIG. 7. More specifically, it is preferable that the incident angle of Ar gas be in a range from −10° to 15° with respect to the surface of the object to be processed 10. In this case, the tendency of removing the convex portion faster than the concave portion can be made stronger, and the etching rate of the filling material 36 deposited on the side faces of the first mask layer 22 can be increased. The flattening effect can be also enhanced.

When a height of a top surface of the filling material 36 in the concave portions 34 becomes approximately coincident with a height of a top surface of the stop film 35, ion beam etching is stopped. In this manner, most of the excess part of the filling material 36 on the recording elements 32A is removed, as shown in FIG. 7. Although an end of the first mask layer 22 is removed faster than other portions, the first mask layer 22 is left on the stop film 35 while completely covering the stop film 35. Therefore, the recording elements 32A are protected by the first mask layer 22 against ion beam etching. Even if the end of the first mask layer 22 is removed up to the top surface of the stop film 35, the recording element 32A can be protected by the stop film 35 against ion beam etching.

The reason why the first mask layer 22 is left with completely covering the stop film 35 at the time when the height of the top surface of the filling material 36 in the concave portions 34 becomes approximately coincident with that of the stop film 35 is that the etching rate of C (the first mask layer 22=the temporary underlying material) in ion beam etching using Ar gas is lower than that of $SiO_2$ (the filling material 36). The above etching rates can be made equal or be reversed by using reactive gas that has a property of chemically reacting with C to remove C as the process gas. For example, when mixed gas of Ar gas and $O_2$ or $O_3$ gas is used as the process gas and flow rate ratios of them are adjusted, the above etching rates can be made equal or be reversed.

Figure 8:
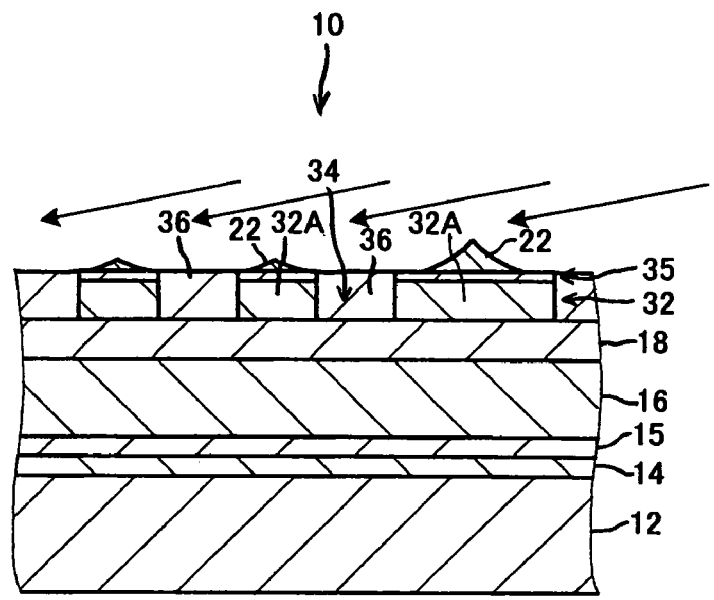
FIG. 8 is a schematic cross-sectional side view showing another exemplary shape of the object to be processed in which the excess part of the filling material is removed to expose the first mask layer.

If the etching rate of C (the first mask layer 22=the temporary underlying material) is set to be higher than that of $SiO_2$ (the filling material 36), a portion near the end of the first mask layer 22 is removed up to the top surface of the stop film 35 at the time when the height of the top surface of the filling material 36 in the concave portion 34 becomes approximately coincident with the height of the top surface of the stop film 35, as shown in FIG. 8. In this case, the filling material 36 covering the side faces of the first mask layer 22 is completely removed. Therefore, highly precise flattening can be achieved.

When the etching rate of the first mask layer 22=the temporary underlying material is set to be higher than that of the filling material 36 as described above, it is especially preferable that the top surface of the recording elements 32A be covered with the stop film 35 as in the present first exemplary embodiment, in order to protect the recording elements 32A against etching.

Moreover, in this case, it is more preferable that an etching rate of the stop film 35 in dry etching of the filling material removing step (S106) be lower than that of the filling material 36, because stop of etching can be easily controlled in the filling material removing step (S106) and the process accuracy is improved. In this first exemplary embodiment, the material for the stop film 35 is Ta, the filling material 36 is $SiO_2$, and an etching rate of Ta in dry etching in the filling material removing step (S106) is lower than that of $SiO_2$. Therefore, the above condition is satisfied.

Figure 9:
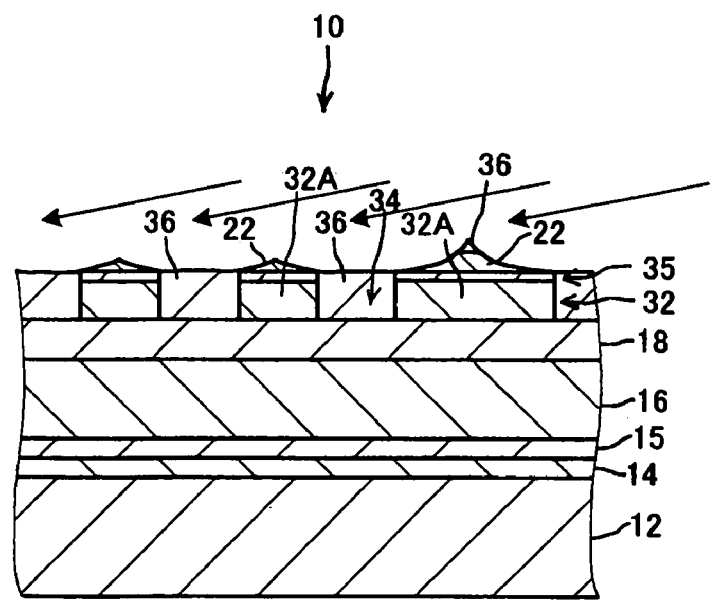
FIG. 9 is schematic cross-sectional side view showing another exemplary shape of the object to be processed in which the excess part of the filling material is removed to expose the first mask layer.

If the above etching rates are set to be equal to each other, when the height of the top surface of the filling material 36 in the concave portion 34 becomes approximately the same as the height of the top surface of the stop film 35, the first mask layer 22 is left on the stop film 35 with completely covering the stop film 35 in a state where the thickness of the end of the first mask layer 22 is approximately zero, as shown in FIG. 9. Thus, the filling material 36 covering the side faces of the first mask layer 22 can be completely removed and the recording elements 32A can be protected against ion beam etching.

Figure 10:
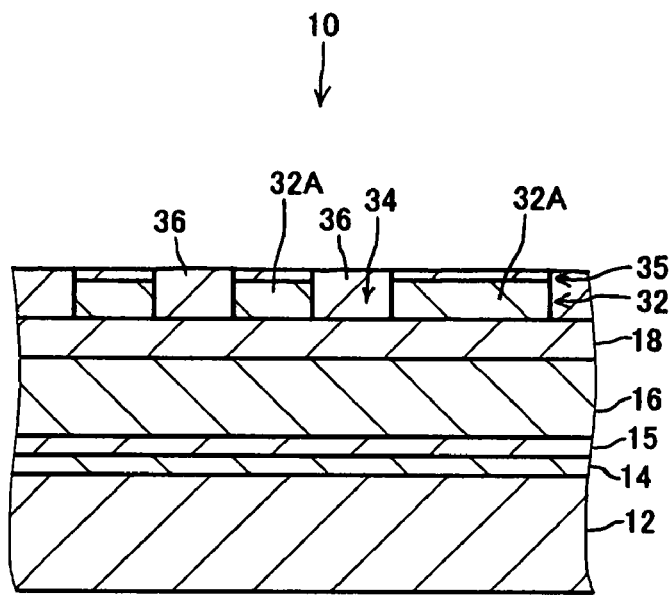
FIG. 10 is schematic cross-sectional side view showing the shape of the object to be processed in which a surface of the filling material and a surface of a stop film are flattened.

Next, the flattening step is performed (S108). More specifically, as shown in FIG. 10, a surface is flattened by removing the first mask layer 22 by an etching method in which an etching rate of C (the first mask layer 22=the temporary underlying material) is higher than that of $SiO_2$ (the filling material 36). For example, reactive ion etching using $O_2$ or $O_3$ gas as reactive gas can be used.

In this manner, the first mask layer 22 forming the convex portions is quickly removed, while processing of the filling material 36 forming the concave portions is suppressed. Although a difference of the etching rate of the first mask layer forming the convex portions may be temporarily generated depending on the widths of the convex portions, the first mask layer is entirely removed in a short time. Moreover, a part of the excess part of the filling material 36 may remain on the first mask layer 22 after the filling material removing step (S106). However, that part can be also removed with the first mask layer 22. In addition, the etching rate of the stop film 35 and that of the filling material 36 with which the concave portions 34 are filled are lower than that of the first mask layer 22 in the flattening step (S108). Therefore, the height of the top surface of the stop film 35 and that of the filling material 36 are kept approximately the same. That is, surface flattening is achieved. The recording elements 32A are protected by the stop film 35 against etching.

As described above, the first mask layer 22 also serves as the temporary underlying material and can be selectively removed in a short time irrespective of the widths of the convex portions formed by the first mask layer 22 (the temporary underlying material) in the flattening step (S108). Therefore, it is possible to prevent generation of a difference of surface roughness and formation of a step.

Next, the protective layer 38 of DLC is formed to have a thickness of 1 to 5 nm on the top surface of the stop film 35 and the filling material 36 by CVD. Then, PFPE is applied onto the protective layer 38 by dipping to form the lubricating layer 40 having a thickness of 1 to 2 nm (S110). Thus, the magnetic recording medium 30 shown in FIG. 2 is completed.

As described above, even when the filling material 36 is deposited on the side faces of the first mask layer (the temporary underlying material) 22 in the filling material depositing step (S104), the filling material 36 on the side faces of the first mask layer 22 is removed by dry etching that tends to selectively remove a convex portion faster than a concave portion in the filling material removing step (S106). Moreover, the first mask layer 22 serving as the temporary underlying material and a part of the excess part of the filling material 36 located on the first mask layer 22 are selectively removed in the flattening step (S108) by an etching method in which the etching rate of the first mask layer (the temporary underlying material) 22 is higher than that of the filling material 36, so that surface flattening is achieved. Since the protective layer 38 and the lubricating layer 40 are formed after the surface of the stop film 35 (on the recording elements 32A) and the surface of the filling material 36 are surely flattened in the above manner, the magnetic recording medium 30 can have a sufficiently flat surface and a good head flying property.

Moreover, the etching method for selectively removing the first mask layer 22 in the flattening step (S108) is dry etching using reactive gas that has a property of chemically reacting with the first mask layer 22 to remove the first mask layer 22, and both the filling material removing step (S106) and the flattening step (S108) use dry etching. Therefore, the production efficiency is higher, as compared with a case of using a dry process and a wet process together.

In addition, the recording elements 32A are not etched in the filling material removing step (S106) and the flattening step (S108) because the stop film 35 is formed on the recording elements 32A. Therefore, magnetic characteristics are not degraded. That is, the magnetic recording medium 30 has good recording and reproduction accuracy.

Furthermore, the filling material 36 on the stop film 35 can be surely removed without etching the recording elements 32A in the flattening step (S108), because the stop film 35 is formed on the recording elements 32A. In this respect, the magnetic recording medium 30 also has good recording and reproduction accuracy.

The etching rate of the stop film 35 is low in the etching in the flattening step (S108). Thus, the stop film 35 can be made thin by that extent. Therefore, even if the stop film 35 is left on the recording elements 32A, an effect of the stop film 35 on the recording and reproduction accuracy is small.

In the first exemplary embodiment, ion beam etching using Ar gas or mixed gas of Ar and $O_2$ or $O_3$ is employed in the filling material removing step (S106). Alternatively, ion beam etching using other noble gas, e.g., Kr (krypton) or Xe (xenon) gas, may be employed. Alternatively, other dry etching such as reactive ion beam etching using $H_2$ gas, $NH_3$ gas or halogen-containing reactive gas, e.g., $SF_6$, $CF_4$ (carbon tetrafluoride), and $C_2F_6$ (hexafluoroethane) or reactive ion beam etching using mixed gas of reactive gas and noble gas may be employed.

Table 1 shows exemplary combinations of a dry etching method in the filling material removing step (S106), the filling material 36, and the material for the first mask layer 22, each of which provides the etching rate of the first mask layer 22 higher than that of the filling material 36.

TABLE 1

| Type of ion beam etching in filling material removing step | | | First mask layer | |
| --- | --- | --- | --- | --- |
| Process gas | Incident angle of ion beams | Filling material | (temporary underlying material) | Etching method in flattening step |
| $O_2$, $O_3$, $H_2$, $NH_3$ gas | −10° or more and 90° or less (all angles) | $SiO_2$, Si, TaSi, TiN, Ta, ITO, MgO, Nb, $ZrO_2$, $WO_2$, $Al_2O_3$ | C | Reactive ion etching using $O_2$, $O_3$, $H_2$ or $NH_3$ gas |
| Ar, Kr, Xe, Ne (noble gas) | −10° or more and 15° or less | TaSi, TiN, Ta, Nb, $ZrO_2$, $WO_2$, $Al_2O_3$ | | |
| | | Cu | $SiO_2$, Si, ITO, MgO | Reactive ion etching using halogen-containing gas |
| | | Cr | $SiO_2$, Si, ITO, MgO, $Al_2O_3$ | |

TABLE 1-continued

| Type of ion beam etching in filling material removing step | | | First mask layer | |
|---|---|---|---|---|
| Process gas | Incident angle of ion beams | Filling material | (temporary underlying material) | Etching method in flattening step |
| $SF_6$, $CF_4$, $C_2F_6$, $CL_2$, $BCl_3$ (halogen-containing gas) | −10° or more and 90° or less (all angles) | Cu, Cr | $SiO_2$, Si, TaSi, TiN, Ta, ITO, MgO, $ZrO_2$, $WO_2$, $Al_2O_3$ | |

ITO: Indium tin oxide

On the other hand, Table 2 shows exemplary combinations of the dry etching method in the filling material removing step (S106), the filling material 36, and the material for the first mask layer 22, each of which provides the etching rate of the first mask layer 22 lower than that of the filling material 36.

TABLE 2

| Type of ion beam etching in filling material removing step | | | First mask layer | |
|---|---|---|---|---|
| Process gas | Incident angle of ion beams | Filling material | (temporary underlying material) | Etching method in flattening step |
| Ar, Kr, Xe, Ne (noble gas) | −10° or more and 15° or less | $SiO_2$, Si, ITO, MgO | C | Reactive ion etching using $O_2$, $O_3$, $H_2$ or $NH_3$ gas |
| | | Cu | TaSi, TiN, Ta, C, $ZrO_2$, $WO_2$, $Al_2O_3$ | Reactive ion etching using halogen-containing gas |
| | | Cr | TaSi, TiN, Ta, $ZrO_2$, $WO_2$ | |

Both Table 1 and Table 2 show examples using one kind of process gas solely. Alternatively, it is possible to adjust each etching rate and a relationship between the etching rate of the first mask layer 22 and that of the filling material 36 by adjusting the incident angle of the process gas or by using mixed gas of reactive gas such as oxygen gas or halogen-containing gas and noble gas and then adjusting a mixed ratio. It is also possible to make the etching rate of the first mask layer 22 approximately equal to that of the filling material 36.

In the first exemplary embodiment, the filling material 36 is $SiO_2$, the first mask layer (the temporary underlying material) 22 is formed of C, and the flattening step (S108) employs reactive ion etching in which $O_2$ or $O_3$ gas is used as reactive gas and the etching rate of the first mask layer 22 is higher than that of the filling material 36. However, the filling material 36, the material for the first mask layer (the temporary underlying material) 22, and the type of the etching are not specifically limited, as long as a combination of them that can make the etching rate of the first mask layer 22 higher than that of the filling material 36 is selected. Examples of the filling material 36 include nonmagnetic materials, e.g., other oxides, nitrides such as TiN (titanium nitride), Ta, TaSi, and Si. Moreover, a soft magnetic material may be used as the filling material 36 depending on the application of the magnetic recording medium 30. In addition, a metal material or a photoresist material may be used as the material for the first mask layer (the temporary underlying material) 22, for example. Examples of the type of the etching in the flattening step (S108) include dry etching using $H_2$ gas, $NH_3$ gas or halogen-containing gas as reactive gas and wet etching. Examples of preferable combinations of the filling material 36, the material for the first mask layer 22, and the dry etching method in the flattening step (S108) are also shown in Tables 1 and 2.

Next, a second exemplary embodiment of the present invention is described.

Figure 11:
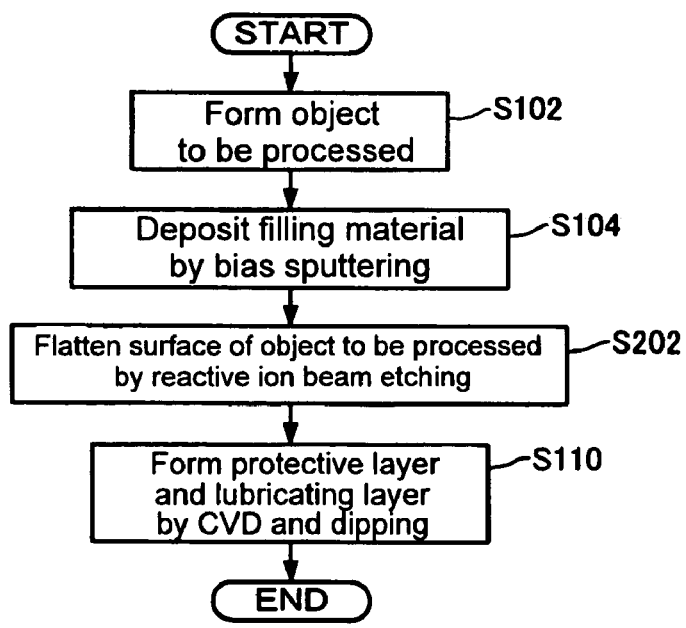
FIG. 11 is a flowchart generally showing a manufacturing process of a magnetic recording medium according to a second exemplary embodiment of the present invention.

The excess part of the filling material 36 and the first mask layer 22 (the temporary underlying material) are removed in two steps, i.e., the filling material removing step (S106) and the flattening step (S108) in the first exemplary embodiment, whereas the excess part of the filling material 36 and the first mask layer (the temporary underlying material) 22 are removed in the flattening step (S202) only in the second exemplary embodiment, as shown in a flowchart of FIG. 11. Except for the above, the second exemplary embodiment is the same as the first exemplary embodiment. Therefore, the description of other steps in the second exemplary embodiment is omitted.

In the flattening step (S202) of the second exemplary embodiment, in a state where the filling material 36 is deposited and the concave portions 34 are filled with the filling material 36, as shown in FIG. 6, dry etching using reactive gas that has a property of chemically reacting with the first mask layer (the temporary underlying material) 22 to remove the first mask layer 22, in which the etching rate of the first mask layer 22 is higher than that of the filling material 36, is performed so as to remove the excess part of the filling material 36 and the first mask layer 22, thereby flattening the surface.

An example of the above dry etching method is reactive ion beam etching using mixed gas of Ar gas and $O_2$ or $O_3$ gas as process gas. The etching rates of the filling material 36 and the first mask layer 22 can be adjusted by adjusting flow rate ratios of the mixed gas. More specifically, the etching rate of C can be made higher than that of $SiO_2$ by setting a ratio of Ar gas to $O_2$ gas to approximately 3 (Ar):2 ($O_2$) or increasing the $O_2$ ratio from that ratio. Incidentally, the etching rates can be slightly changed by the incident angle of the process gas.

When the height of the top surface of the filling material 36 in the concave portion 34 becomes approximately the same as the height of the top surface of the stop film 35, dry etching is stopped. In this manner, the excess part of the filling material 36 above the recording elements 32A and the first mask layer (the temporary underlying material) 22 are completely removed and the surface is flattened, as shown in FIG. 10.

Incidentally, the thickness of the first mask layer (the temporary underlying material) 22 left over the recording elements 32A and the deposited thickness of the filling material 36 are adjusted in advance so as to make the top surface of the filling material 36 with which the concave portions are filled approximately coincident with the top surface of the stop film 35 in a minute time after the first mask layer (temporary underlying material) 22 over the recording elements 32A is completely removed.

If the etching rate of the stop film 35 is lower than that of the filling material 36 in dry etching in the flattening step (S202), it is easy to perform control for making the top surface of the filling material 36 with which the concave portions are filled approximately coincident with the top surface of the stop film 35. In this second exemplary embodiment, the material for the stop film 35 is Ta, the filling material 36 is $SiO_2$, and an etching rate of Ta is lower than that of $SiO_2$ in dry etching in the flattening step (S202). Therefore, the above condition is satisfied.

As described above, it is possible to efficiently remove the filling material 36 covering the side faces of the first mask layer (the temporary underlying material) 22 because dry etching that tends to selectively remove a convex portion faster than a concave portion is used in the flattening step (S202). Moreover, the first mask layer 22 above the recording elements 32A can be removed rapidly, when dry etching in which the etching rate of the first mask layer 22 is high is used. A difference of the etching rate of the first mask layer 22 forming the convex portions may be temporarily generated depending on the widths of the convex portions. However, the first mask layer 22 is entirely removed in a short time. Moreover, it is possible to suppress processing of the stop film 35 because the etching rate of the stop film 35 is lower than that of the first mask layer 22 in the flattening step (S202). As described above, the first mask layer 22 and the excess part of the filling material 36 can be removed in one step and surface flattening can be achieved. Therefore, the production efficiency can be further improved.

In this second exemplary embodiment, the filling material 36 is $SiO_2$, the first mask layer (the temporary underlying material) 22 is made of C, and the flattening step (S202) employs reactive ion beam etching in which process gas containing $O_2$ or $O_3$ is used and the etching rate of the first mask layer 22 is higher than that of the filling material 36. However, the filling material 36, the material for the first mask layer 22, and the type of the dry etching in the flattening step (S202) are not specifically limited, as long as a combination thereof that can make the etching rate of the first mask layer 22 higher than that of the filling material 36 is selected. Table 3 shows exemplary preferable combinations.

TABLE 3

| Type of ion beam etching in flattening step | | | First mask layer |
|---|---|---|---|
| Process gas | Incident angle of ion beams | Filling material | (temporary underlying material) |
| $O_2$, $O_3$, $H_2$, $NH_3$ gas | −10° or more and 90° or less (all angles) | $SiO_2$, Si, TaSi, TiN, Ta, ITO, MgO, Nb, $ZrO_2$, $WO_2$, $Al_2O_3$ | C |
| Ar, Kr, Xe, Ne (noble gas) | −10° or more and 15° or less | TaSi, TiN, Ta, Nb, $ZrO_2$, $WO_2$, $Al_2O_3$ | |
| | | Cu | $SiO_2$, Si, ITO, MgO |
| | | Cr | $SiO_2$, Si, ITO, MgO, $Al_2O_3$ |
| $SF_6$, $CF_4$, $C_2F_6$, $CL_2$, $BCl_3$ (halogen-containing gas) | −10° or more and 90° or less (all angles) | Cu, Cr | $SiO_2$, Si, TaSi, TiN, Ta, ITO, MgO, $ZrO_2$, $WO_2$, $Al_2O_3$ |

Table 3 shows the examples using one type of process gas solely. Alternatively, mixed gas of reactive gas, such as oxygen gas, $H_2$ gas, $NH_3$ gas, or halogen-containing gas, and noble gas may be used, as long as the relationship of the etching rate of the first mask layer 22 and that of the filling material 36 is not reversed as in the second exemplary embodiment described above.

Moreover, the type of the process gas can be changed during the filling material removing step (S106) in the first exemplary embodiment or the flattening step (S202) in the second exemplary embodiment. For example, the filling material removing step (S106) in the first exemplary embodiment or the flattening step (S202) in the second exemplary embodiment is divided into two steps. In the first step, noble gas such as Ar gas is used as process gas, and the etching rate of the temporary underlying material is made approximately equal to or lower than that of the filling material. In the latter step, mixed gas of Ar gas and gas that chemically reacts with the temporary underlying material, such as $O_2$ or $O_3$ gas, is used, and the etching rate of the temporary underlying material is made higher than that of the filling material. Alternatively, mixed gas of a plurality of types of gas may be used as the process gas in the filling material removing step (S106) in the first exemplary embodiment or the flattening step (S202) in the second exemplary embodiment, and ratios of the plurality of types of gas may be gradually changed during that step. For example, mixed gas of noble gas and $O_2$ or $O_3$ gas may be used as the process gas in each of the above steps, and the flow rate ratio of $O_2$ or $O_3$ gas may be gradually increased.

The material for the stop film 35 is Ta in the first and second exemplary embodiments. Alternatively, another nonmagnetic material may be used for the stop film 35, as long as it has a low etching rate in the filling material removing step (S106) and the flattening step (S108 and S202).

The stop film 35 serves as both a stop film for the filling material removing step and a stop film for the flattening step in the first exemplary embodiment. Alternatively, the stop film for the filling material removing step and the stop film for the flattening step may be formed separately from each other.

In the first exemplary embodiment, suppose that a damage of the recording layer 32 caused by etching becomes a problem in only one of the filling material removing step (S106) and the flattening step (S108) but does not become a problem in the other step. In this case, a material having a low etching rate only in the etching in the step in which the damage of the recording layer 32 caused by the etching becomes a problem may be used as the material for the stop film 35.

The stop film 35 may be omitted, if the first mask layer 22 can sufficiently protect the recording elements 32A against etching or an effect of etching on the recording elements 32A is sufficiently small. In this case, the excess part of the filling material 36 is removed so as to make the top surface of the filling material 36 with which the concave portions are filled coincident with the top surface of the recording elements 32A. This is the same in the second exemplary embodiment.

Figure 12:
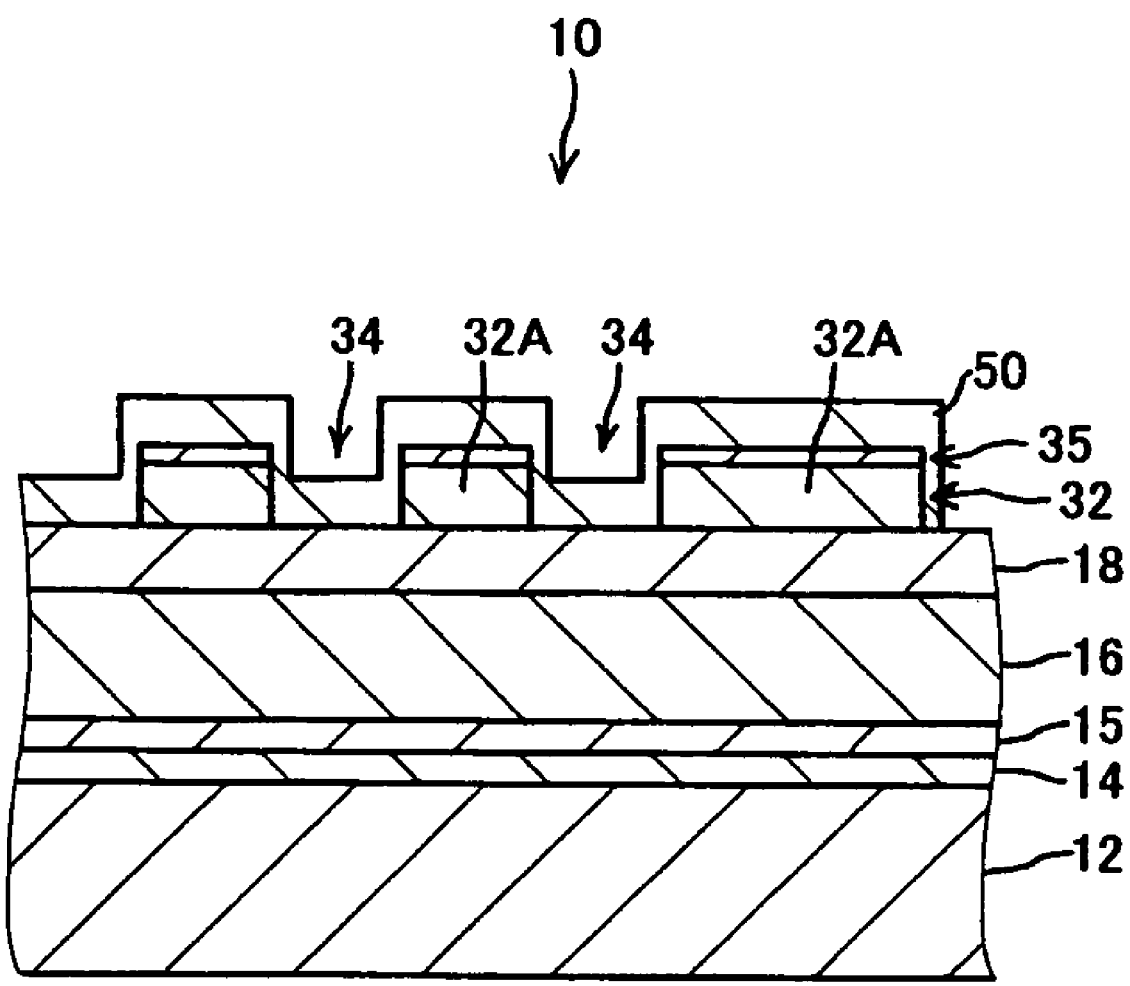
FIG. 12 is a schematic cross-sectional side view showing another example of formation of a temporary underlying material according to an exemplary embodiment of the present invention.

In the first and second exemplary embodiments, the first mask layer 22 is left on the recording elements 32A during processing of the continuous recording layer 20 into the recording layer 32, and the first mask layer 22 thus left is used as the temporary underlying material. Alternatively, a temporal underlayer 50 may be deposited on the recording layer 32, as shown in FIG. 12, after the continuous recording layer 20 is processed into the recording layer 32. The temporary underlayer 50 is also deposited at a bottom of the concave portion 34 and on side faces thereof. In this case, the material for the first mask layer 22 is not specifically limited by a function of the temporary underlayer. That is, the material for the first mask layer 22 can be appropriately selected so as to be suitable for processing of the recording layer. Alternatively, the first mask layer 22 may be left on the recording elements 32A during processing of the continuous recording layer 20 into the recording layer 32, and the temporary underlayer 50 may be deposited on the first mask layer 22 thus left. In this case, the material for the temporary underlayer 50 may be the same as that for the first mask layer 22 or different from that for the first mask layer 22, as long as it has a higher etching rate than that of the filling material 36 in the flattening step (S108 and S202).

In the first and second exemplary embodiments, the first mask layer 22, the second mask layer 24, and the resist layer 26 are formed over the continuous recording layer 20, the continuous recording layer 20 is divided by 4 steps of dry etching, and the first mask layer 22 serves as the temporary underlying material. However, the materials for the resist layer and the mask layers, the number of those layers, and the thickness of each of those layers are not specifically limited, as long as the continuous recording layer 20 can be divided with high precision. For example, the second mask layer may be omitted. Alternatively, both the second and first mask layers may be omitted so as to allow the resist layer to be formed directly on the continuous recording layer. In this case, the continuous recording layer may be divided by using the resist layer as a mask layer, and the resist layer may also serve as the temporary underlying material.

The filling material 36 is deposited by bias sputtering in the first and second exemplary embodiments. Alternatively, the filling material 36 may be deposited by another deposition method, e.g., sputtering with no bias application, CVD, or IBD.

Immediately after the filling material depositing step (S104), the filling material removing step (S106) is performed in the first exemplary embodiment and the flattening step (S202) is performed in the second exemplary embodiment. Alternatively, after deposition of the filling material 36, a covering material that is different from the filling material 36 may be deposited on the filling material 36 and thereafter the filling material removing step (S106) or the flattening step (S202) may be performed. In this case, it is preferable to select the covering material and the etching method so as to make an etching rate of the covering material lower than that of the filling material 36 in the filling material removing step (S106) (the flattening step (S202) in the second embodiment)). In addition, the concave portions 34 may be filled with both the filling material 36 and the covering material in this case. For example, the filling material 36 may be deposited in the concave portions 34 to have a thickness slightly smaller than the depth of the concave portions 34 in the filling material depositing step (S104). The covering material is then deposited on the thus deposited filling material 36. In this manner, the concave portions 34 can be filled with both of the filling material 36 and the covering material.

The continuous recording layer 20 (recording elements 32A) are made of a CoCr alloy in the first and second exemplary embodiments. Alternatively, other materials, e.g., other alloys containing an iron-group element (Co, Fe (iron), Ni) and a stack of those can be used.

The underlayer 14, the antiferromagnetic layer 15, the soft magnetic layer 16, and the seed layer 18 are formed under the continuous recording layer 20 in the first and second exemplary embodiments. However, the structure of the layers under the continuous recording layer 20 can be changed in an appropriate manner in accordance with a type of a magnetic recording medium. For example, one or more of the underlayer 14, the antiferromagnetic layer 15, the soft magnetic layer 16, and the seed layer 18 may be omitted. Alternatively, the continuous recording layer may be formed directly on the substrate.

The recording layer 32 and other layers are formed on only one side of the substrate 12 in the magnetic recording medium 30 in the first and second exemplary embodiments. However, the present invention can be also applied to a method for manufacturing a double-sided recording type magnetic recording medium that includes recording layers on both surfaces of the substrate, respectively.

The magnetic recording medium 30 is a perpendicular recording type discrete track magnetic disk in which the recording layer 32 is divided in a radial direction of tracks at fine intervals in the first and second exemplary embodiments. However, the present invention can be also applied to a method for manufacturing a magnetic disk including a magnetic disk in which a recording layer is divided in a circumferential direction of tracks (i.e., a sector direction) at fine intervals, a magnetic disk in which a recording layer is divided in both the radial direction and the circumferential direction of tracks at fine intervals, a PERM (Pre-Embossed Recording Medium) type magnetic disk including a continuous recording layer having a concavo-convex pattern, and a magnetic disk in which a recording layer has a spiral shape. The present invention can be also applied to manufacturing of a longitudinal recording type magnetic recording medium. Moreover, the present invention can be also applied to a magneto optical disc such as MO, a heat assisted magnetic disk that uses magnetism and heat together, and other magnetic recording media that have shapes different from the disk shape and include a recording layer formed in a concavo-convex pattern, such as a magnetic tape.

What is claimed is:

1. A method for manufacturing a magnetic recording medium comprising:
   an object to be processed forming step of forming an object to be processed that includes a recording layer formed in a predetermined concavo-convex pattern over a substrate and a temporary underlying material formed at least on convex portions of the recording layer;

a filling material depositing step of depositing a filling material different from the temporary underlying material on the object to be processed to fill concave portions of the concavo-convex pattern with the filling material;

a filling material removing step of removing at least a part of an excess part of the filling material by dry etching to expose at least side faces of the temporary underlying material formed on the convex portions of the recording layer, the excess part of the filling material being located on an opposite side of a top surface of the convex portions of the recording layer to the substrate; and a flattening step of flattening a surface by removing the temporary underlying material by an etching method in which an etching rate of the temporary underlying material is higher than that of the filling material.

2. The method for manufacturing a magnetic recording medium according to claim 1, wherein the etching method in the flattening step is dry etching using reactive gas that has a property of chemically reacting with the temporary underlying material to remove the temporary underlying material.

3. The method for manufacturing a magnetic recording medium according to claim 1, wherein process gas is made incident on the object to be processed from a direction that is inclined with respect to a normal of a surface of the object to be processed in the filling material removing step.

4. The method for manufacturing a magnetic recording medium according to claim 1, wherein dry etching in which the etching rate of the temporary underlying material is equal to or lower than that of the filling material is used in the filling material removing step.

5. The method for manufacturing a magnetic recording medium according to claim 1, wherein dry etching in which the etching rate of the temporary underlying material is higher than that of the filling material is used in the filling material removing step.

6. The method for manufacturing a magnetic recording medium according to claim 5, wherein a stop film for the filling material removing step is formed between the temporary underlying material and the recording layer in the object to be processed forming step, an etching rate of the stop film being lower than that of the temporary underlying material in the dry etching in the filling material removing step.

7. The method for manufacturing a magnetic recording medium according to claim 4, wherein reactive gas that has a property of chemically reacting with one of the filling material and the temporary underlying material selectively to remove it is used in the filling material removing step.

8. The method for manufacturing a magnetic recording medium according to claim 5, wherein reactive gas that has a property of chemically reacting with one of the filling material and the temporary underlying material selectively to remove it is used in the filling material removing step.

9. The method for manufacturing a magnetic recording medium according to claim 4, wherein ion beam etching is used in the filling material removing step.

10. The method for manufacturing a magnetic recording medium according to claim 5, wherein ion beam etching is used in the filling material removing step.

11. The method for manufacturing a magnetic recording medium according to claim 1, wherein a stop film for the flattening step is formed between the temporary underlying material and the recording layer in the object to be processed forming step, an etching rate of the stop film being lower than that of the temporary underlying material in the etching of the flattening step.

12. The method for manufacturing a magnetic recording medium according to claim 1, wherein in the object to be processed forming step, portions of a continuous recording layer formed over the substrate that correspond to the convex portions of the concavo-convex pattern are covered with a mask layer; exposed portions of the continuous recording layer that are uncovered by the mask layer are removed by etching to form the recording layer having the concavo-convex pattern; and the mask layer remaining on the convex portions of the recording layer is used as at least a part of the temporary underlying material.

13. A method for manufacturing a magnetic recording medium comprising:

an object to be processed forming step of forming an object to be processed that includes a recording layer formed in a predetermined concavo-convex pattern over a substrate and a temporary underlying material formed at least on convex portions of the recording layer;

a filling material depositing step of depositing a filling material different from the temporary underlying material on the object to be processed to fill concave portions of the concavo-convex pattern with the filling material; and a flattening step of flattening a surface by removing an excess part of the filling material and the temporary underlying material by dry etching, the excess part of the filling material being located on an opposite side of a top surface of the convex portions of the recording layer to the substrate, an etching rate of the temporary underlying material being higher than that of the filling material in the dry etching.

14. The method for manufacturing a magnetic recording medium according to claim 13, wherein reactive gas that has a property of chemically reacting with the temporary underlying material to remove the temporary underlying material is used in the flattening step.

15. The method for manufacturing a magnetic recording medium according to claim 13, wherein a stop film for the flattening step is formed between the temporary underlying material and the recording layer in the object to be processed forming step, an etching rate of the stop film in the dry etching of the flattening step being lower than that of the temporary underlying material.

16. The method for manufacturing a magnetic recording medium according to claim 13, wherein process gas is made incident on the object to be processed from a direction that is inclined with respect to a normal of a surface of the object to be processed in the flattening step.

17. The method for manufacturing a magnetic recording medium according to claim 13, wherein in the object to be processed forming step, portions of a continuous recording layer formed over the substrate that correspond to the convex portions of the concavo-convex pattern are covered with a mask layer; exposed portions of the continuous recording layer that are uncovered by the mask layer are removed by etching to form the recording layer having the concavo-convex pattern; and the mask layer remaining on the convex portions of the recording layer is used as at least a part of the temporary underlying material.

* * * * *